US005819550A

United States Patent [19]

Saia, III et al.

[11] Patent Number: 5,819,550

[45] **Date of Patent: *Oct. 13, 1998**

[54] PORTABLE SELF-CONTAINED COOLER/ FREEZER

[75] Inventors: Louis P. Saia, III, 106 Suite A Jim Bowie Rd., Houma, La. 70363; Russell Andrews, Montegut, La.

[73] Assignee: Louis P. Saia, III, Houma, La.

[ * ] Notice: The term of this patent shall not extend beyond the expiration date of Pat. No. 5,473,908.

[21] Appl. No.: 718,577

[22] PCT Filed: Apr. 3, 1995

[86] PCT No.: PCT/US95/04112

§ 371 Date: May 5, 1997

§ 102(e) Date: May 5, 1997

[87] PCT Pub. No.: WO95/26888

PCT Pub. Date: Oct. 12, 1995

Related U.S. Application Data

[63] Continuation-in-part of Ser. No. 222,425, Apr. 1, 1994, Pat. No. 5,473,908, and a continuation-in-part of Ser. No. 905, 791, Jun. 29, 1992, Pat. No. 5,337,579, and a continuation-in-part of Ser. No. 602,856, Oct. 23, 1990, Pat. No. 5,125, 237, and a continuation-in-part of Ser. No. 493,298, Mar. 14, 1990, Pat. No. 4,991,402, and a continuation-in-part of Ser. No. 343,025, Apr. 24, 1989, abandoned, and a continuation-in-part of Ser. No. 119,702, Nov. 12, 1987, Pat. No. 4,825, 666.

[51] Int. Cl.[6] .................... B60H 1/32

[52] U.S. Cl. .................... 62/239; 62/384

[58] Field of Search .................... 62/239, 384; 294/67.41, 294/74

[56] References Cited

U.S. PATENT DOCUMENTS

| | | | |
|---|---|---|---|
| 909,222 | 1/1909 | Reynolds | 294/67.41 |
| 2,235,719 | 3/1941 | Matarese | 294/67.41 |
| 3,385,073 | 5/1968 | Snelling | 62/45.1 |
| 3,519,302 | 7/1970 | Orenstein | 294/67.41 |
| 4,066,287 | 1/1978 | Rowley | 294/67.41 |
| 4,467,612 | 8/1984 | Wensel, Jr. | 62/78 |
| 4,825,666 | 5/1989 | Saia, III | 62/384 |
| 5,337,579 | 8/1994 | Saia, III et al. | 62/384 |

*Primary Examiner*—Ronald C. Capossela
*Attorney, Agent, or Firm*—Garvey, Smith, Nehrbass & Doody, L.L.C.

[57] ABSTRACT

A transportable container (500) for carrying refrigerated products in frozen subzero Fahrenheit (below −18° C.) or refrigerated (for example, 40° F. (4° C.) temperatures) includes a structural container (512) having an insulated outer shell with an access doorway (521). The upper potion of the container (500) includes a tray or drawer in which are disposed a pair of spaced apart canisters containing liquid refrigerant ($CO_2$, for example). A gas or liquid feeder tube penetrates each bottle and communicates with an on/off valve. A feeder tube can draw liquid to dispense for cooling, or it can release gas and pressure within the canister to boil the $CO_2$. When $CO_2$ reaches its boiling point, the canister, its brackets, and the cold plate reach very cold temperatures to cool the cargo area through conduction. The gas is released through an injection nozzle into the cargo holding area.

18 Claims, 2 Drawing Sheets

PORTABLE SELF-CONTAINED COOLER/ FREEZER

This is a continuation-in-part of U.S. patent application Ser. No. 08/222,425, filed 1 Apr. 1994, now U.S. Pat. No. 5,473,908 and a continuation-in-part of U.S. patent application Ser. No. 07/905,791, filed Jun. 29, 1992, now U.S. Pat. No. 5,337,579, and a continuation-in-part of U.S. patent application Ser. No. 07/602,856, filed Oct. 23, 1990, now U.S. Pat. No. 5,125,237, and a continuation-in-part of U.S. patent application Ser. No. 07/493,298, filed Mar. 14, 1990, now U.S. Pat. No. 4,991,402, and a continuation in part of Ser. No. 343,025, filed Apr. 24, 1989 (now abandoned) and a continuation in part of Ser. No. 119,702, filed Nov. 12, 1987, now U.S. Pat. No. 4,825,666, all incorporated herein by reference.

BACKGROUND OF THE INVENTION

1. Field of the Invention

The present invention relates to portable controlled-temperature (such as frozen and/or refrigerated) containers having self-contained cooling systems.

2. General Background

Many truck lines use refrigerated trucks to carry food products over long distances. The present invention is an economical substitute for refrigerated trucks when less than a full truckload of refrigerated or frozen cargo is to be transported. For more background on this invention, see U.S. Pat. No. 5,125,237.

SUMMARY OF THE PRESENT INVENTION

The present invention solves the problems and shortcomings of the prior art in a simple straightforward manner by providing an improved portable transportable refrigeration system for use on common carrier type truck lines, airplanes, and boats, for example.

The apparatus disclosed herein comprises a self-supporting container having an interior for carrying refrigerated or frozen or other controlled-temperature cargo and adapted to be lifted by a forklift or a crane means, or both. Thus, the container of the present invention is a versatile container which can be used on trucks, airplanes, and boats, enabling a shipper of frozen or refrigerated cargo to use the same container whether it is shipping via ground, air, or sea, or some combination of one or more of these methods.

The present specification discusses a strap lifting system which allows the container to be easily lifted with a crane. For detailed information about the functioning of the refrigeration system of the present invention, please see the prior Saia and Saia et al. patents and patent applications which are incorporated herein by reference.

The present invention comprises apparatus for shipping controlled-temperature cargo in an unrefrigerated cargo area of a substantially larger transport vehicle, vessel, or aircraft. The apparatus of the present invention preferably comprises a container having an interior area with a volume to be loaded with frozen and/or refrigerated and/or other controlled-temperature cargo with an access opening that can be opened and closed, self-contained temperature-control means in the container for maintaining a desired preselected preset refrigerated or frozen temperature range within the container interior, and lifting means attached to the container for allowing the container to be picked up by a crane means by attaching the crane means to the lifting means.

The lifting means is preferably attached to the container in such a manner as to balance the container when the crane means is attached at a single point to the lifting means. Preferably, the container has a base plate having two spaced apart, parallel slots adapted to be engaged by a forklift lifting device.

The container preferably includes a top, side walls, and a bottom, and the lifting means preferably includes lifting eyes attached to the bottom of the container, strap means attached to the lifting eyes and extending above the top of the container when the container is upright, and spreader bars attached to the top of the container for substantially preventing contact between the side walls of the container and the strap means, the strap means contacting the spreader bars. Preferably, the strap means are joined together at a point above the top of the container to enable the container to be picked up by a crane means attached to the lifting means at the point. Also, the spreader bars preferably have inner and outer ends and include rollers adjacent the outer ends, providing a low-friction connection between the strap means and the spreader bars.

The lifting means is preferably certified for a maximum weight capacity of double the weight of the container when it is fully loaded with product.

The method of the present invention comprises a method of shipping refrigerated or frozen perishable goods in an unrefrigerated area of a vessel having a cargo holding area. The method preferably comprises the steps of placing the perishable goods into a structural container that can be placed in the cargo holding area of the vessel; cooling the perishable goods by dispensing a liquid refrigerant from one or more liquid refrigerant containing canisters that are transported within the container; using a valve to dispense liquid refrigerant coolant from the canisters; controlling temperature within the container interior area by a control of the degree of opening of the valve; and transferring the container to and from the vessel with a crane means by attaching the crane means to a lifting means which is permanently attached to the container. The lifting means is preferably attached to the container in such a manner as to balance the container when the crane means is attached at a single point to the lifting means.

The method of the present invention preferably comprises the additional step of moving the container around the vessel with a forklift.

It is an object of the present invention to provide a refrigerated transport device including means to facilitate lifting of the device by a crane.

BRIEF DESCRIPTION OF THE DRAWINGS

A better understanding of the invention can be had when the detailed description of a preferred embodiment set forth below is considered in conjunction with the drawings, in which.

DETAILED DESCRIPTION OF THE PREFERRED EMBODIMENT

Figure 4:
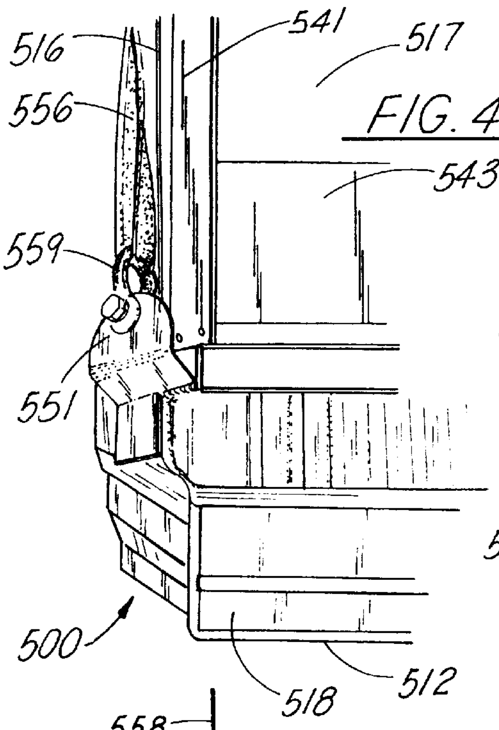
FIG. 4 is a detail of the apparatus of the preferred embodiment of the present invention.

The following is a list of elements of the present invention:

19 spaced apart recesses
20 spaced apart recesses
500 apparatus of the preferred embodiment of the present invention
512 container
513 upper surface of container 512
514 side wall of container 512
515 side wall of container 512
516 side wall of container 512
517 side wall of container 512
518 bottom portion of container 512
521 door of container 512
522 closure latch
533 gas inlet to allow container 512 to be preliminarily cooled with an external gas supply or to be used to fill the cylinders containing refrigerant
535 microprocessor based temperature controller to set temperature in container 512
537 door over control panel 535
539 door covering a compartment for shipping instructions, bills of lading, etc.
541 stainless steel angles along edges of sides of container 512
542 stainless steel angles along top edges of container 512
543 stainless steel scuff plates along sides of container 512
550 strap lifting system
551 lifting eyes
552 3" (7.6 cm) aluminum channel spreader bar riveted to stainless steel angles 541
553 3" (7.6 cm) aluminum channel spreader bars riveted to stainless steel angles 541
554 3⁄16" (0.48 cm) aluminum plate welded to spreader bars 552, 553
555 2" (5.1 cm) diameter polyurethane rollers riveted onto spreader bars 552, 553
556 3" (7.6 cm) by 11' (3.4 m) nylon web slings attaching lift eyes 551 to nylon strap 557
557 3" (7.6 cm) by 4' (1.2 m) nylon web sling attaching together slings 556
558 main lifting shackle
559 shackles attached to lifting eyes 551
560 openings in bars 552 and 553

Figure 3:
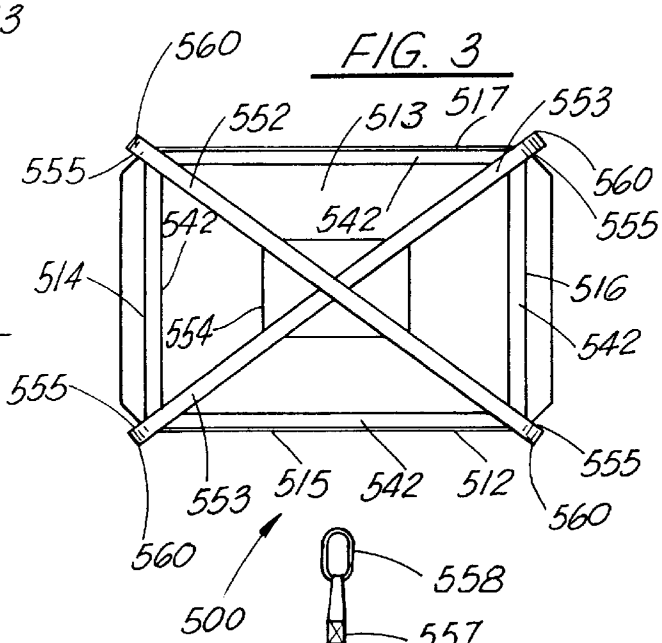
FIG. 3 is a top view of the apparatus of the preferred embodiment of the present invention.
Figure 1:
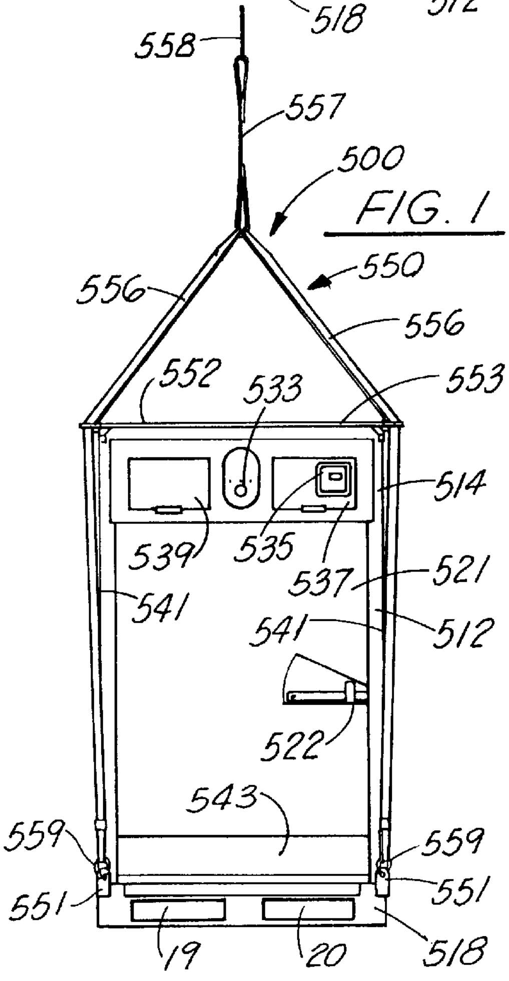
FIG. 1 is a front view of the apparatus of the preferred embodiment of the present invention, with the lifting straps shown in the position they assume when the main lifting shackle is attached to a lifting cable (not shown) of a crane (not shown)
Figure 2:
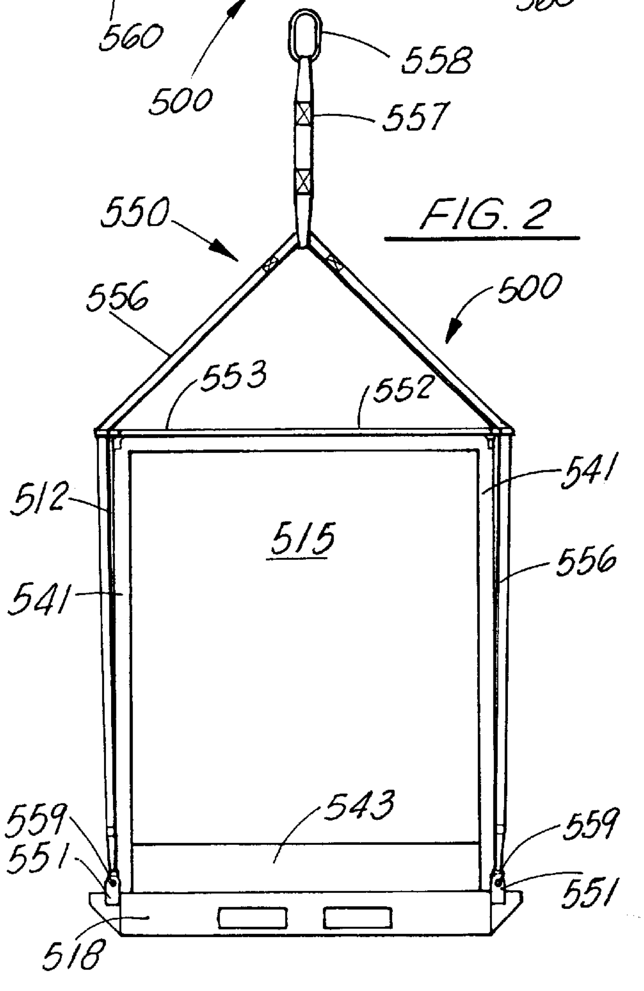
FIG. 2 is a side view of the apparatus of the preferred embodiment of the present invention, with the lifting straps shown in the position they assume when the main lifting shackle is attached to a lifting cable (not shown) of a crane (not shown)
Figure 5:
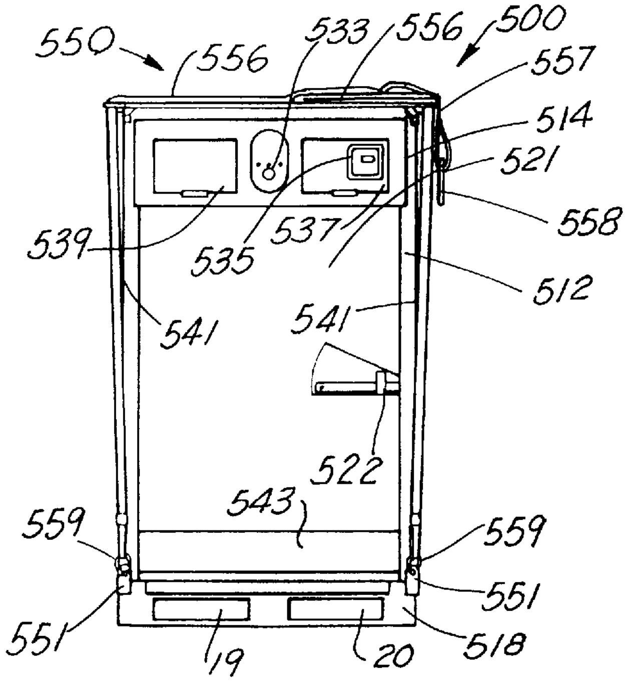
FIG. 5 is a front view of the apparatus of the preferred embodiment of the present invention, with the lifting straps shown in the position they assume when the main lifting shackle is not attached to a lifting cable of a crane.
Figure 6:
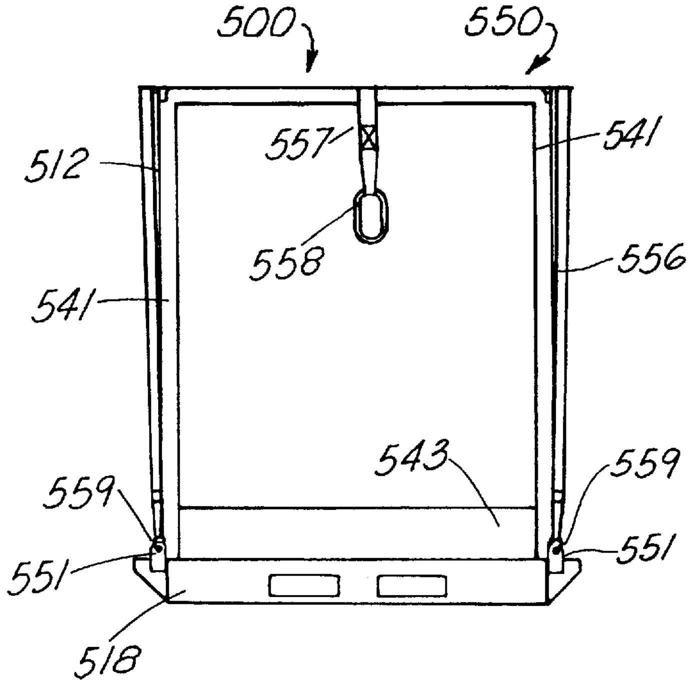
FIG. 6 is a side view of the apparatus of the preferred embodiment of the present invention, with the lifting straps shown in the position they assume when the main lifting shackle is not attached to a lifting cable of a crane.

The apparatus of the preferred embodiment of the present invention, container apparatus 500, is shown in FIGS. 1–6. Container apparatus 500 includes a container 512 and a strap lifting system 550. A lockable door 521 allows access to the interior of container 512. As was mentioned earlier, the refrigeration system inside container 512 can be the same as that disclosed, for example, in the prior Saia and Saia et al. patents and applications mentioned earlier.

In FIGS. 1–6, there can be seen an enlarged rectangular transportable box-like container 512 having an upper surface 513 (see FIG. 3) and a plurality of side walls 514, 515, 516, 517 forming an enclosure with a bottom portion 518 of the container 512. The bottom portion 518 includes a pair of spaced apart recesses 19, 20, for example, which can be used to form a connection with the tines of a fork lift so that the container 512 can be easily moved and transported about, such as during unloading or loading of trucks or airplanes.

Container 512 includes a plurality of stainless steel angles 541, one along each edge of the sides of container 512 and a plurality of stainless steel angles 542 along the top edges of container 512. There is a stainless steel plate 543 along the lower portion of each side of container 512. Plates 543 help prevent container 512 from being damaged by fork lift tines and angles 541 help prevent container 512 from being damaged by direct blows; the angles 541 allow the container to take a glancing blow, as freight is moved in and out of trailers.

The present invention also includes a lifting means for easily lifting container 512 with a crane. The lifting means includes a strap lifting system 550 including four lifting eyes 551, spreader bars 552 and 553, and strap means comprising nylon web slings 556 and 557.

There is a gas inlet 533 to allow the cylinders in container 512 to be filled by an external gas supply and, by changing the position of a ball valve (not shown), to preliminarily cool the container 512 with the external gas supply to conserve the gas supply inside container 512. A microprocessor based temperature controller 535 is used to set the temperature in container 512. There is a door 537 over control panel 535. A door 539 covers the bill of lading compartment.

There are four lifting eyes 551, one welded to the bottom 518 of container 512 at each lower corner. There is a shackle 559 attached to each of the lifting eyes 551.

A 3" (7.6 cm) aluminum channel spreader bar 552 is riveted to stainless steel angles 541 and welded to a 3⁄16" (0.48 cm) aluminum plate 554. Two 3" (7.6 cm) aluminum channel spreader bars 553 are likewise riveted to stainless steel angles 541 and welded to plate 554. Two-inch diameter polyurethane rollers 555 are riveted onto spreader bars 552, 553, adjacent the outer ends thereof.

Nylon web slings 556, preferably 3" (7.6 cm) by 11' (3.4 m), attach shackles 559 to nylon web sling 557. Nylon web slings 556 pass through openings 560 in bars 552 and 553 and rest against the outer edge of rollers 555. Openings 560 are large enough to allow slings 556 to pass therethrough without rubbing on anything but rollers 555. Nylon web sling 557, preferably 3" (7.6 cm) by 4' (1.2 m), attaches slings 556 together above the top of container 512. A main lifting shackle 558 is connected to the top of nylon web sling 557. Container 512 is lifted by attaching the cable from a crane to shackle 558.

The rollers 555 at the end of each spreader bar 552 and 553 provide guidance for nylon web slings 556. Rollers 555 provide a practically frictionless point of contact between slings 556 and bars 552 and 553, reducing frictional wear of slings 556 to an absolute minimum.

Spreader bars 552 and 553 and rollers 555 keep slings 556 in place and prevent slings 556 from putting pressure on walls 513, 514, 515, and 516, which could cause a wall to give in.

Preferably, the strap lifting system 550 is certified for a maximum weight capacity of double the weight of container 512 fully loaded with product.

Thus, the present invention provides a method of transporting refrigerated products in a self-contained temperature-controlled container which has means to allow the container to quickly and easily be moved with a crane.

In operation, the container 512 is filled with the product to be transported therein. The desired temperature is set on the microprocessor based temperature controller 535 (after lifting door 537 to gain access thereto), and an external source of gas (not shown) is connected to fill nipple or gas inlet 533 and is used to fill the cylinders with cryogen as well as preliminarily cool the interior of container 512. The lifting cable from a crane or other similar lifting device is then attached to shackle 558, and the crane or other similar lifting device lifts container 512. Once moved, for example, from a dock to a ship, a fork lift can be used to move container 512 around the ship. Offshore, another crane, or the crane on the ship or boat, can be used to transfer container 512 to another ship or an offshore oil platform. Thus, container 512 has the advantage of being usable not only on trucks or airplanes, for example, but can quickly and easily be transported onto a ship or boat.

Container 512 preferably does not exceed 120 inches (3.05 m) in any dimension, more preferably does not exceed 100 inches (2.54 m) in any dimension, and most preferably does not exceed 90 inches (2.3 m) in any dimension.

To allow container 512 to be easily used in either trucks or on ships, container 512 preferably does not exceed 106 inches (2.69 m) in height (the height of the tallest trailer in commercial use of which applicants are aware), 84 inches (2.1 m) in width, and 96 inches (2.4 m) in depth, more preferably does not exceed 100 inches (2.54 m) in height, 72 inches (1.8 m) in width, and 84 inches (2.1 m) in depth, and even more preferably does not exceed 90 inches (2.3 m) in height, 60 inches (1.5 m) in width, and 72 inches (1.8 m) in depth. Most preferably, container 512 does not exceed 82 inches (2.1 m) in height, 48 inches (1.2 m) in width, and 70 inches (1.78 m) in depth to allow it to easily be transported by a forklift and to allow two containers 512 to fit side-by-side in a standard dry container trailer (typically 96 inches (2.4 m) in width). The preferred width is about 47 inches (1.2 m), as then container 512 is about as wide as it can be and still fit side-by-side in a standard dry container trailer without being too tight a fit. Exemplary dimensions for container 512 are 82 inches (2.1 m) in height, 47 inches (1.2 m) in width, and 68.5 inches (1.7 m) in depth. These are preferably the dimensions which container 512 has when the length of slings 556 are 11 feet (3.4 m) long and sling 557 is 4 feet (1.2 m) long. Container 512 can have a capacity, for example, of 72.3 cubic feet (2,047 liters).

It is preferable for slings 556 and 557 to be long enough to enable the main lifting shackle 558 to hang over the side of the container 512 when the container 512 is not being lifted by the main lifting shackle 558. The reason for this is that in an offshore environment, the seas are frequently rough and it is difficult to connect a crane lifting cable to a lifting shackle on a container. The present invention is advantageous in that one can grasp the main lifting shackle 558 (as it hangs over the side of the container 512) and the lifting cable of the crane and easily connect them. Both the length of the slings and their flexibility contribute to the facility of connecting the lifting cable of the crane and the main lifting shackle 558.

Side walls 514–517 are preferably covered with stainless steel to enable them to withstand the harsh, often corrosive conditions and rough handling present in an offshore environment.

In view of the numerous modifications which could be made to the preferred embodiments disclosed herein without departing from the scope or spirit of the present invention, the details herein are to be interpreted as illustrative and not in a limiting sense.

We claim:

1. Apparatus for shipping controlled-temperature cargo in an unrefrigerated cargo area of a substantially larger transport vehicle, vessel, or aircraft, comprising:

a) a container having an interior area with a volume to be loaded with frozen and/or refrigerated and/or other controlled-temperature cargo with an access opening that can be opened and closed;

b) at least one refrigerant tank mounted in the container for containing a cryogenic liquified refrigerant under pressure to be utilized for cooling the container interior;

c) discharge piping means for piping refrigerant from the tanks;

d) valve means communicating with the discharge piping for valving the flow of refrigerant that is discharged from the tank;

e) temperature responsive controller means for opening the valve means to dispense liquified refrigerant from the tanks in order to maintain a desired preselected preset refrigerated or frozen temperature range within the container interior; and f) lifting means attached to the container for allowing the container to be picked up by a crane means by attaching the crane means to the lifting means.

2. The apparatus of claim 1, wherein the lifting means is attached to the container in such a manner as to balance the container when the crane means is attached at a single point to the lifting means.

3. The apparatus of claim 1, further comprising g) an undercarriage portion at the lower end of the container that includes moving means for transporting the container quickly to and from the cargo area of an unrefrigerated vehicle, vessel, or aircraft having a substantially larger volume than the container volume.

4. The apparatus of claim 1, wherein the container has a base plate having two spaced apart, parallel slots adapted to be engaged by a forklift lifting device.

5. The apparatus of claim 1, wherein the container includes a top, side walls, and a bottom, and the lifting means includes:

(i) lifting eyes attached to the bottom of the container;

(ii) strap means attached to the lifting eyes and extending above the top of the container when the container is upright; and (iii) spreader bars attached to the top of the container for substantially preventing contact between the side walls of the container and the strap means, the strap means contacting the spreader bars.

6. The apparatus of claim 5, wherein the strap means are joined together at a point above the top of the container to enable the container to be picked up by a crane means attached to the lifting means at the point.

7. The apparatus of claim 5, wherein the spreader bars have inner and outer ends and include rollers adjacent the outer ends, providing a low-friction connection between the strap means and the spreader bars.

8. The apparatus of claim 5, further comprising a main lifting shackle attached to the strap means to enable the container to be lifted by a crane, and wherein the strap means are long enough to enable the main lifting shackle to hang over the side of the container when the container is not being lifted by the main lifting shackle.

9. The apparatus of claim 1, wherein the lifting means is certified for a maximum weight capacity of double the weight of the container when it is fully loaded with product.

10. Apparatus for shipping controlled-temperature cargo in an unrefrigerated cargo area of a substantially larger transport vehicle, vessel, or aircraft, comprising:

a) a container having an interior area with a volume to be loaded with frozen and/or refrigerated and/or other controlled-temperature cargo with an access opening that can be opened and closed;

b) at least one refrigerant tank mounted in the container for containing a cryogenic liquified refrigerant under pressure to be utilized for cooling the container interior;

c) discharge piping for piping refrigerant from the tanks;

d) a valve communicating with the discharge piping for valving the flow of refrigerant that is discharged from the tank;

e) a temperature responsive controller for opening the valve to dispense liquified refrigerant from the tanks in order to maintain a desired preselected preset refrigerated or frozen temperature range within the container interior; and f) a lifting system attached to the container for allowing the container to be picked up by a crane by attaching the crane to the lifting system.

11. The apparatus of claim 10, wherein the lifting system is attached to the container in such a manner as to balance the container when the crane is attached at a single point to the lifting system.

12. The apparatus of claim 10, further comprising g) an undercarriage portion at the lower end of the container that includes forklift recesses for transporting the container quickly to and from the cargo area of an unrefrigerated vehicle, vessel, or aircraft having a substantially larger volume than the container volume.

13. The apparatus of claim 10, wherein the container has a base plate having two spaced apart, parallel slots adapted to be engaged by a forklift lifting device.

14. The apparatus of claim 10, wherein the container includes a top, side walls, and a bottom, and the lifting system includes:

(i) lifting eyes attached to the bottom of the container;

(ii) straps attached to the lifting eyes and extending above the top of the container when the container is upright; and (iii) spreader bars attached to the top of the container for substantially preventing contact between the side walls of the container and the straps, the straps contacting the spreader bars.

15. The apparatus of claim 14, wherein the straps are joined together at a point above the top of the container to enable the container to be picked up by a crane attached to the lifting system at the point.

16. The apparatus of claim 14, wherein the spreader bars have inner and outer ends and include rollers adjacent the outer ends, providing a low-friction connection between the straps and the spreader bars.

17. The apparatus of claim 14, further comprising a main lifting shackle attached to the straps to enable the container to be lifted by a crane, and wherein the straps are long enough to enable the main lifting shackle to hang over the side of the container when the container is not being lifted by the main lifting shackle.

18. The apparatus of claim 10, wherein the lifting system is certified for a maximum weight capacity of double the weight of the container when it is fully loaded with product.

* * * * *